Oct. 7, 1924.

F. HODGKINSON
GEAR CUTTER
Filed Aug. 11, 1920

1,511,077

2 Sheets-Sheet 1

INVENTOR.
Francis Hodgkinson
BY D.C. Davis
ATTORNEY

Oct. 7, 1924.								1,511,077
F. HODGKINSON
GEAR CUTTER
Filed Aug. 11, 1920					2 Sheets-Sheet 2

INVENTOR.
Francis Hodgkinson
BY D.C. Davis
ATTORNEY

UNITED STATES PATENT OFFICE.

FRANCIS HODGKINSON, OF SWARTHMORE, PENNSYLVANIA, ASSIGNOR TO WESTING-HOUSE GEAR AND DYNAMOMETER COMPANY, A CORPORATION OF PENNSYLVANIA.

GEAR CUTTER.

Application filed August 11, 1920. Serial No. 402,806.

*To all whom it may concern:*

Be it known that I, FRANCIS HODGKINSON, a subject of the King of Great Britain and Ireland, and a resident of Swarthmore, in the county of Delaware and State of Pennsylvania, have invented a new and useful Improvement in Gear Cutters, of which the following is a specification.

This invention relates to gear cutting machines of the type intended for the cutting of relatively large or high-power and high-speed gears especially of the reduction type ordinarily employed for speed reduction purposes in connection with steam turbines.

An object of my invention is to provide a driving mechanism for the table of a gear cutting machine which includes a plurality of pairs of meshing gear tooth elements so disposed that the points of engagement of the meshing tooth elements vary progressively thereby providing for the transmission of motion from the driving agents to the gear table at a more uniform rate than has been done heretofore.

Another object of my invention is the provision of a worm driven mechanism for a gear cutter in which a plurality of driving worms meshes with a common driven worm and in which the driving worms are disposed relatively to the driven worm gear that progressive errors of pitch and contour errors of teeth are compensated for.

These and other objects are attained by means of apparatus embodying the features herein described and illustrated in drawings accompanying and forming a part of this application.

Figure 1:
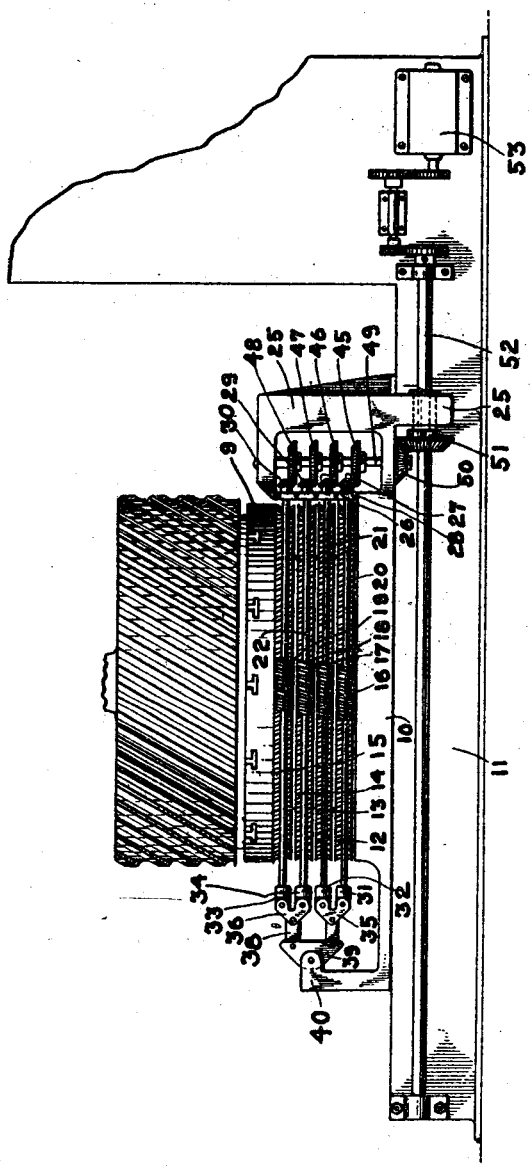
Figure 3:
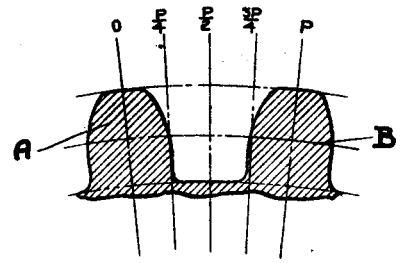
Figure 2:
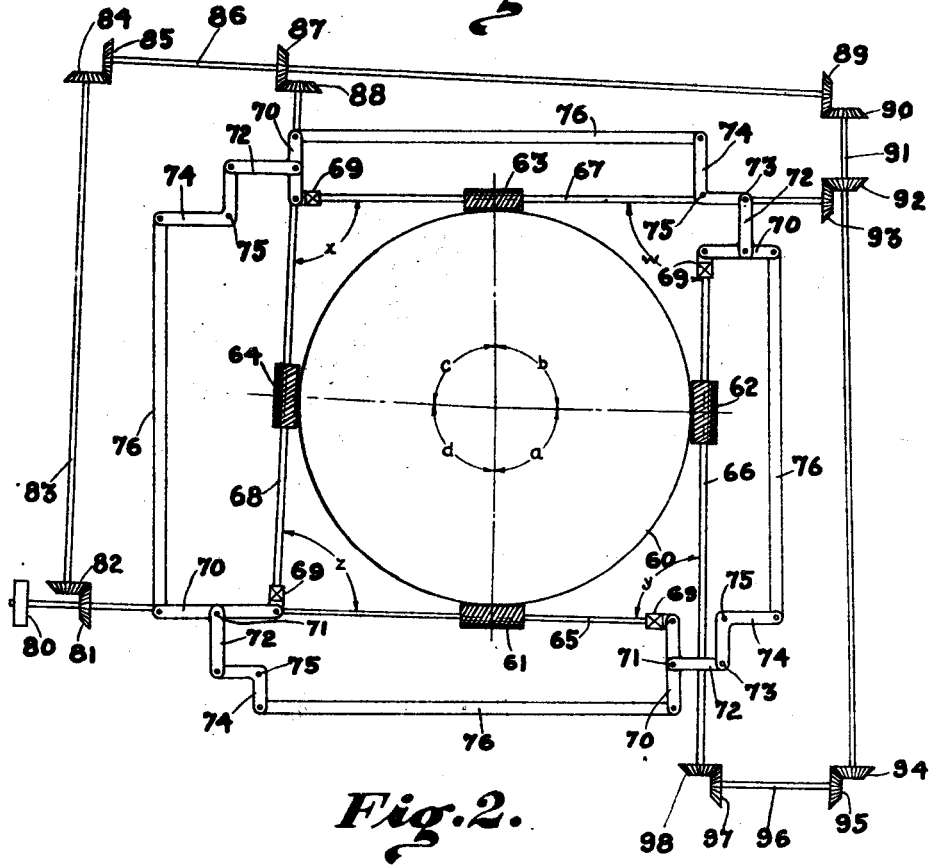

In the drawings, Fig. 1 is a fragmentary view of a gear cutting machine showing my invention applied thereto; Fig. 2 is a diagrammatic view showing another form of my invention; and Fig. 3 is a view of gear teeth for the purpose of explaining the invention.

In the construction of high-speed and high-power gearing such, for instance, as is used for speed reduction in connection with turbines, it is desirable that the gears be cut with as great a degree of accuracy as possible in order to insure the efficient transmission of power and the elimination or reduction of noise. In other words, the circular pitch should be uniform and the contours of the teeth should be accurate. In practice, it has been found to be difficult to cut gears, especially of very large size, without introducing reproduction errors of the transmission employed in the gear cutting machine. It will be obvious that, if the gear train driving the gear table has either or both errors in pitch or of the contour of the teeth, such errors will be reproduced in the blank being hobbed. Accordingly, it is the purpose of my invention to provide a transmission for a gear cutting machine table which will minimize the reproduction of the errors of transmission on the gear being cut.

Referring to Fig. 1, a gear table 9 is shown rotatable about a vertical axis and is supported by the carriage 10. The table is provided with a plurality of superposed worm gears 12, 13, 14 and 15 which are designed to be driven by means of driving worms 16, 17, 18 and 19 carried, respectively, by the driving shafts 20, 21, 22 and 23. At one end, the carriage 10 supports a standard 25 and the latter is provided with bearings for supporting the right hand ends of the shafts 20, 21, 22 and 23. Beyond the bearings of the bearing support, the shafts have connected, respectively, thereto the bevel or mitre gears 27, 28, 29 and 30, or the shafts may be driven in any desired manner. The other ends of the shafts 20, 21, 22 and 23 are supported in thrust bearings 31, 32, 33 and 34, respectively, the lower thrust bearings 31 and 32 being connected to a whiffletree lever 35 and the upper thrust bearings 33 and 34 being connected to whiffletree lever 36. The two whiffletree levers 35 and 36 are connected by means of links 37 and 38 to the whiffletree lever 39 which is pivoted to the standard 40 carried by the supporting carriage. It will be seen that the whiffletree construction amounts to a doubletree arrangement whereby pressure is equalized between several driving shafts.

The mitre or bevel pinions 27, 28, 29 and 30 are driven respectively by bevel gears 45, 46, 47 and 48 and the latter are supported by a vertical shaft 49 carried by bearings in the standard 25. The lower end of the shaft 49 is provided with a bevel gear 50 driven by a bevel gear 51 journaled in and carried by a downwardly projecting portion 25′ of the carriage, the bevel gear being splined to the shaft 52 whereby power is transmitted regardless of the position of the carriage with reference to the base 11 of the machine. The shaft 52 is driven by any appropriate means, such, for instance, as the motor 53. It is apparent that the worm shafts may be driven in any desired manner so long as they are driven positively and at closely similar speed.

The worm gears 12, 13, 14 and 15 are similar and are so arranged that corresponding teeth thereof are progressively spaced apart a distance corresponding to one-quarter of the pitch. With this arrangement of worm gears, it will be obvious that, with similar driving worms and with the latter arranged substantially in the same plane, due to the whiffletree arrangement of connecting the shafts, errors existing within the various worm gears and worms will be compensated for, and thus it will be possible to drive the table 9 at a more uniform rate of motion whereby gears of greater accuracy may be cut.

From Fig. 3, it will be seen how the points of engagement of the worms and teeth progressively vary. In other words, in accordance with applicant's principle, the pitch between corresponding points of adjacent teeth is divided into as many substantially equal parts as there are worms. I have shown an arrangement having four worms. Consider point O as projecting from a bisector of the tooth A and the point P is projected from a bisector of the tooth B. The distance along the pitch circle between the bisectors is of course the pitch. This distance is divided into four parts, designated. $\frac{1}{4}$ P, $\frac{1}{2}$ P, $\frac{3}{4}$ P and P. The worm gears 12, 13, 14 and 15 are relatively displaced circumferentially so that a series of four results, each spaced $\frac{1}{4}$ of the pitch ahead of the one behind. For instance, the gear 13 may be spaced one-fourth the pitch from the gear 12, the gear 14 may be spaced in the same way with reference to the gear 13 and the gear 15 may be spaced with reference to gear 14. It is obvious that the gears 12, 13, 14 and 15 may be relatively spaced in any way so that a series may be found following the rule of progressive spacing.

Instead of having the gears 12, 13, 14 and 15 of the gear table spaced angularly and progressively by relative distances of one-quarter of the pitch, all of the gears may be similarly arranged with reference to the gear table. In that case it would be necessary, in effect, to rock the worms 16, 17, 18 and 19 on their worm gears so that points of engagement would be simultaneously had which differ over each other by one-quarter of the pitch. It will be apparent that this is, in principle, the same as the preceding when the gears were displaced circumferentially in order to secure the relative advance of the teeth by one-quarter of the pitch. With the worm gears occupying the same relative angular position with reference to the table 9, as has just been stated, it is necessary that the driving worms 16, 17, 18 and 19 be, in effect, rocked on the worm gears; and, in order that the worms may be maintained permanently in this position it would be necessary that the bearing support 26 be inclined with reference to the carriage in order to give a warped effect to the arrangement of driving shafts whereby the worms may take up their positions with points of engagement progressively varying by distances of practically one-quarter of the pitch.

In Fig. 2, I have shown an arrangement of worm gearing for driving the gear table worm gear of a gear cutting machine in which a single driving worm gear 60 is employed. The worm gear 60 is driven by a plurality of worms, preferably four, 61, 62, 63 and 64, which are so disposed with reference to the worm gear that the points of engagement of the four pairs of meshing elements differ relatively substantially one-quarter of the pitch as aforesaid. The worms should be disposed at such relative angles as to provide for the one-quarter pitch spacing. In order to secure this result, it is desirable that the worm shafts for the worms be set at such angles, one with reference to the other, as to secure the progression of the corresponding points of engagement of the meshing elements by one-quarter of the pitch. If it is assumed, in Fig. 3, that the worm gear has 90 teeth, then it is obvious that the teeth are spaced apart 4° and that it would be necessary for the worms to be set progressively one degree ahead of the other with reference to the worm teeth engaged. With 90 teeth, the worms 61, 62, 63 and 64 would be set at the following angles: $a$-91°, $b$-91°, $c$-91° and $d$-87°. With this angular disposition of worms the angles between the worm axes will be as follows: $y$-89°, $z$-89°, $x$-89° and $w$-93°. With this arrangement of worms with reference to the worm gear, it will be seen that worm 62 is in advance of worm 61 by one-fourth of the pitch, that worm 63 is in advance of worm 62 by one-fourth of the pitch or in advance of worm 61 by one-half of the pitch and that worm 64 is in advance of worm 63 by one-fourth of the pitch or in advance of the worm 61 by three-quarters of a pitch.

The worms 61, 62, 63 and 64 in Fig. 2 are carried respectively by the shafts 65, 66, 67 and 68, the latter being supported in thrust bearings 69 at one end and having bevel driving gears at the other. Each thrust bearing, 69, is pivotally connected to a lever 70 which in turn is pivoted at 71 to a link 72, the latter being connected through pivot 73 to a bell crank lever 74 fulcrumed at 75. The end of the lever 70, on the side of the pivot 71 opposite the thrust bearing 69, is connected, by means of a link 76, to the other end of the bell crank lever of an adjoining lever mechanism. The structure then includes four driving worms mounted on shafts and each shaft has a thrust bearing associated therewith. Each of the thrust bearings is supported by means of a lever mechanism such as that just described and the lever mechanisms are connected in series by means of the links 76 connecting the respective bell cranks 74 and the respective thrust bearing supporting levers 70. The shaft 65 is driven by an appropriate driving means, such, for instance, as the gear 80 and the worm shafts 65, 66, 67 and 68 are inter-geared so that they all rotate together when power is applied to shaft 65. Any system of interconnecting gearing may be employed in order to secure the simultaneous and equal rate of rotation of these shafts. As shown in Fig. 2 the bevel gear 81 drives the bevel gear 82, the latter being connected to a shaft 83. The shaft 83 is connected to shaft 86 by bevel gears 84 and 85, the shaft 86 driving the worm shaft 68 through the gears 87 and 88; the shaft 86 is connected to the shaft 91 by bevel gears 89 and 90, the latter shaft being connected to the worm shaft 67 by means of bevel gears 92 and 93; and the shaft 91 drives the worm shaft 66 by means of a system of gearing employing bevel gears 94, 95, the shaft 96, and the bevel gears 97 and 98. Whereas the means for driving and the means for supporting the worms, as above set forth, are preferred by me, it will be obvious that any desired supporting and driving means might be employed so long as the essential characteristics of the pressure equalization and the progressive meshing of the worms, as above set forth, are retained.

From the description of my invention as above set forth, the operation thereof will be obvious to those skilled in the art. It will be apparent that the same underlying fundamental principle exists in the two modifications, that is, applicant has a plurality of meshing gear tooth elements between a driving shaft and driven element and so arranged relatively that the points of engagement of the gear elements progressively vary one-quarter of the pitch distance, when referred to one of the driven gears, to the pitch of the driven elements.

It will be seen that the combination of the worms with the interconnected system of supporting levers and bearings results in the worm wheel being driven at a more uniform rate. In Fig. 2, an arrangement is shown whereby both errors in the circular pitch and errors in the contour of the teeth are compensated for. These desirable results are achieved by the use of a pressure equalization system for supporting the worms and by so disposing the worms relatively to the gear that corresponding points of meshing differ progressively by a fraction of the pitch determined by the number of worms employed. In the construction shown, as above set forth, four worms being employed, a corresponding point of meshing in each worm with the worm gear varies progressively and successively by one-quarter of the pitch; however, it will be obvious that the progression needed might be successive but vary in any manner so long as the desired series of the corresponding points progressively varying in the manner set forth is retained.

It will be apparent that gears of still greater accuracy may be cut by utilizing the principles of my invention if the gears of the gear cutting machine are produced in the same manner. In other words, if the machine employs gears in its drive cut in accordance with the principles of my invention, the errors of pitch and contour would be small, and if my system of compensation is employed therewith, the errors, if any, reproduced would be exceedingly minute.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a gear-cutting machine, the combination of a plurality of pairs of meshing driving and driven worm elements, shafts for supporting the driving worm elements, lever mechanism for interconnecting the shafts to equalize pressure, and driving mechanism for the other ends of the shafts, the points of engagement of said driving worm elements being in advance of each other by a fraction of the pitch determined by the number of driving worm elements.

2. In a gear-cutting machine, the combination of a turn table, a plurality of pairs of meshing driving and driven worm elements for driving the turn table, shafts for supporting the driving worm elements, lever mechanism for interconnecting the shafts to equalize pressure, a thrust bearing between each shaft and the lever mechanism, and driving mechanism for the other ends of the shafts, the points of engagement of the driving worms being in advance of each other by a fraction of the pitch determined by the number of the worms.

3. In a gear-cutting machine, the combination of a turn table, a plurality of pairs of meshing gear elements for driving the turn table, driving shafts carrying certain of the elements, pressure equalizing means for the shafts, and a thrust bearing between each shaft and the pressure-equalizing means, the points of engagement of the teeth of the driving gear elements being in advance of each other by a fraction of the pitch determined by the number of driving gear elements.

4. In a gear-cutting machine, the combination of a driven element, a plurality of worm gears carried thereby, a plurality of worms meshing with the worm gears, and having the points of engagement thereof with the worm gears in advance of each other by a fraction of the pitch determined by the number of worms, a driving shaft for each worm, and pressure-equalizing means for connecting the shaft.

5. In a gear-cutting machine, the combination of a driven element, a plurality of worm gears carried thereby, a plurality of driving worms meshing with the worm gears and having points of engagement thereof with respect to the worm gears in advance of each other by a fraction of the pitch determined by the number of driving worms, a driving shaft for each worm, lever means for equalizing the pressure between the shafts, and thrust bearings between shafts and the lever means.

6. In a gear cutting machine, the combination of a table, four superposed worm gears carried by the table and relatively spaced angularly one-quarter of the pitch distance of the gears, worms meshing with the worm gears, driving shafts for the worms, and pressure equalizing means for supporting the driving shafts at a single end.

7. In a gear cutting machine, the combination of a table, four worm gears of equal pitch connected thereto, the teeth of the worm gears being so arranged as to be in advance, one over the other, of one-quarter of the pitch distance, a driving worm for each of the worm gears, a driving shaft connected to each worm, lever mechanism for interconnecting these shafts at a single end and thrust bearings between the shafts and lever mechanism.

8. In a gear cutting machine, the combination of a rotatable table, a movable carriage for the table, a plurality of superposed worm gears connected to the table, a driving worm for each of the worm gears, the points of engagement of the worms with the worm gears progressively varying by distances corresponding to a fractional part of the pitch determined by the number of worms, pressure equalizing means for supporting the shafts at one end, supporting means carried by the carriage for the equalizing means, and driving means supported by the carriage and connected to the shafts at the other end.

9. In a gear cutting machine, the combination of a table, a movable carriage for supporting the table, four worm gears of equal pitch connected to the table and progressively spaced one from the other, substantially one-fourth of the pitch, driving worms meshing with the worm gears, pressure equalizing means for supporting the shafts at one end, thrust bearings arranged between each shaft and the pressure equalizing means, a support for the pressure equalizing means connected to the carriage, and driving means for the shafts at the other end carried by the movable carriage.

In testimony whereof, I have hereunto subscribed my name.

FRANCIS HODGKINSON.